US011747213B2

(12) United States Patent
Nunez et al.

(10) Patent No.: US 11,747,213 B2
(45) Date of Patent: Sep. 5, 2023

(54) TEMPERATURE SENSOR

(71) Applicant: Unison Industries, LLC, Jacksonville, FL (US)

(72) Inventors: Christian Gerardo Nunez, Querétaro (MX); Dale F. Geislinger, Norwich, NY (US); David E. Artus, Binghamton, NY (US)

(73) Assignee: Unison Industries, LLC, Jacksonville, FL (US)

( * ) Notice: Subject to any disclaimer, the term of this patent is extended or adjusted under 35 U.S.C. 154(b) by 476 days.

(21) Appl. No.: 17/004,102

(22) Filed: Aug. 27, 2020

(65) Prior Publication Data
US 2022/0065706 A1    Mar. 3, 2022

(51) Int. Cl.
| | |
|---|---|
| *G01K 7/02* | (2021.01) |
| *G01K 7/16* | (2006.01) |
| *G01K 1/08* | (2021.01) |
| *G01K 13/02* | (2021.01) |
| *G01K 1/14* | (2021.01) |
| *G01K 13/024* | (2021.01) |

(52) U.S. Cl.
CPC ............... *G01K 7/02* (2013.01); *G01K 1/08* (2013.01); *G01K 1/14* (2013.01); *G01K 7/16* (2013.01); *G01K 13/02* (2013.01); *G01K 13/024* (2021.01)

(58) Field of Classification Search
None
See application file for complete search history.

(56) References Cited

U.S. PATENT DOCUMENTS

| | | | | |
|---|---|---|---|---|
| 3,801,377 A | * | 4/1974 | Brewer | G01K 1/08 |
| | | | | 136/232 |
| 4,321,827 A | | 3/1982 | Anderson | |
| 4,859,076 A | * | 8/1989 | Twerdochlib | G01K 3/14 |
| | | | | 340/595 |
| 7,031,871 B2 | | 4/2006 | Severson et al. | |
| 9,404,809 B2 | * | 8/2016 | Cloutier | G01K 7/22 |

FOREIGN PATENT DOCUMENTS

| | | | |
|---|---|---|---|
| AU | 603259 B2 | 11/1990 | |
| CN | 102768085 A | 11/2012 | |
| EP | 0203622 B1 | 9/1990 | |
| JP | 6484693 B2 | 3/2019 | |
| KR | 10-1936300 B1 | 1/2019 | |
| WO | WO-2008015750 A1 * | 2/2008 | ............. G01K 1/026 |
| WO | WO-2009065908 A1 * | 5/2009 | ............. G01K 1/143 |

* cited by examiner

*Primary Examiner* — Mirellys Jagan
(74) *Attorney, Agent, or Firm* — McGarry Bair PC

(57) ABSTRACT

A temperature sensor for accurately measuring a temperature, such as that of a fluid where the temperature is changing, can include a housing with an exterior surface extending between a first end and a second end. The temperature sensor housing can include a set of exterior grooves, which provides for coupling a set of temperature sensor probes along the exterior of the housing with a probe extending at the first end. Additionally, a set of recesses can be formed in the first end for positioning the probes within the recesses. Furthermore, the interior of the housing can be hollow, with a second type of probe extending through the interior between the first end and the second end.

17 Claims, 6 Drawing Sheets

TEMPERATURE SENSOR

TECHNICAL FIELD

The disclosure generally relates to temperature sensors, such as an air temperature sensor, for example, and specifically to a temperature sensor providing multiple sensing elements to provide reduced variation error between the sensor outputs when exposed to a flow or other environment experiencing temperature change.

BACKGROUND

Temperature sensors, like thermometers have been used to determine local temperature for numerous implementations. However, temperature sensors can have erroneous measurements, particularly when the temperature sensor is exposed to a fluid or gas experiencing a change in temperature.

BRIEF DESCRIPTION

Aspects and advantages of the invention will be set forth in part in the following description, or may be obvious from the description, or may be learned through practice of the invention.

In one aspect, the disclosure relates to a temperature sensor comprising: a housing with an exterior surface including a first end and a second end; an interior passage extending through the housing between the first end and the second end, and defining an interior surface for the housing; a set of grooves provided in the exterior surface extending between the first end and the second end; a set of exterior temperature probes secured to the housing in the set of grooves; and an interior temperature probe extending through the interior passage.

In another aspect, the disclosure relates to a temperature sensor comprising: a housing including an exterior surface extending between a first end and a second end with a set of grooves provided in the exterior surface, and the housing having an interior passage extending through the housing between the first end and the second end; a set of thermocouple temperature sensors mounted to the housing in the set of grooves; and a resistance thermometer mounted to the housing and extending through the interior passage.

In yet another aspect, the disclosure relates to a temperature sensor comprising: a substrate having a first surface separated from a second surface by a set of sidewalls; a set of thermocouples provided on the first surface of the substrate; and a resistance thermometer provided on the second surface of the substrate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
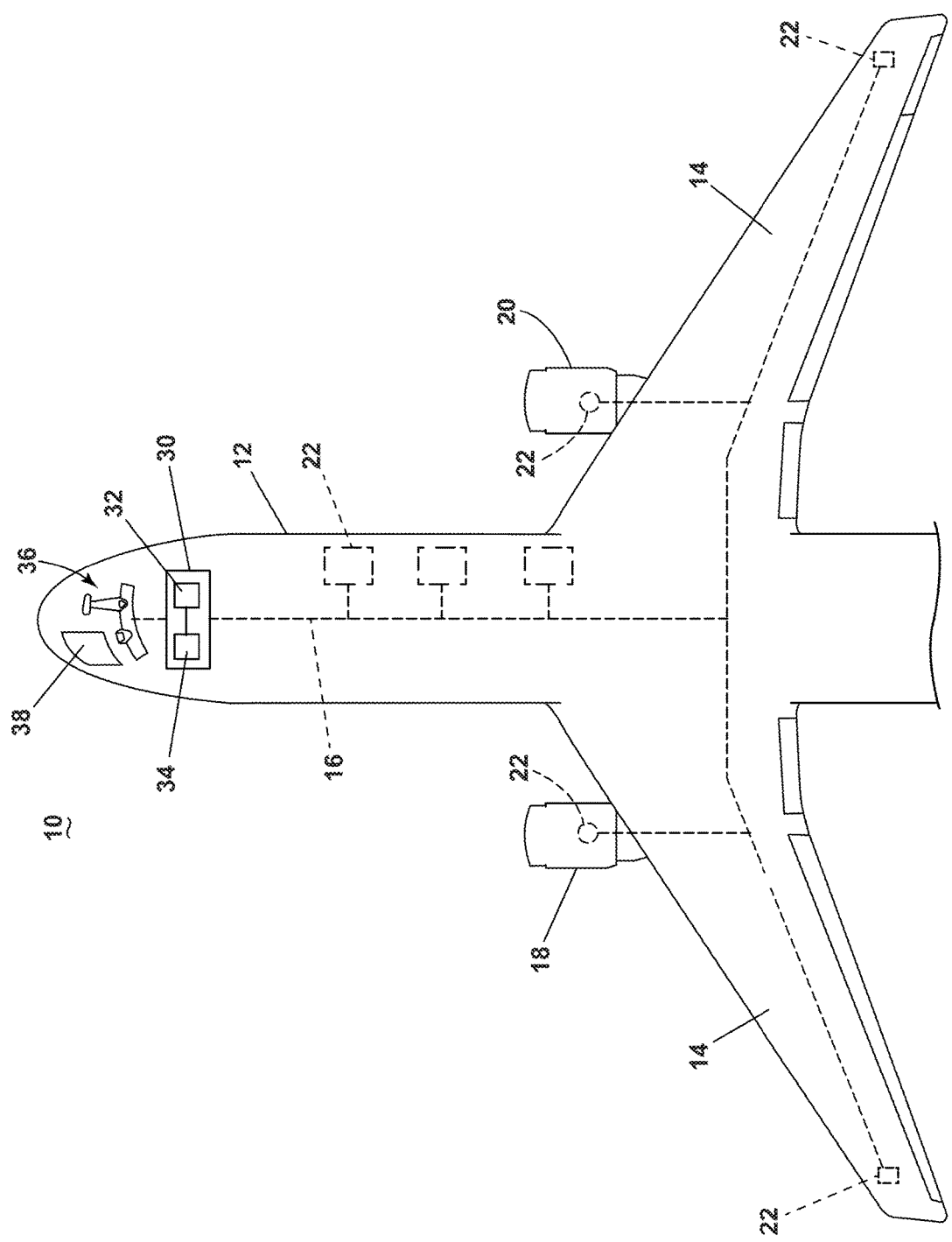
FIG. 1 is a top down schematic view of an exemplary aircraft and power distribution system of the aircraft including a temperature sensor.

Aspects of the present disclosure are described herein in the exemplary context of an aircraft, which utilizes temperature sensors to make measurements of local air temperatures, among other things. However, it will be understood that the disclosure is not so limited and has general applicability to environments requiring temperature measurement, such as those in non-aircraft applications, including other mobile applications and non-mobile industrial, commercial, and residential applications, or any other locale, area, or other environment where temperature measurement is desirable. Notably, such a temperature sensor would have applicability in areas where temperatures are varying along with a local fluid or gas flow. For example, applicable mobile environments can include an aircraft, spacecraft, space-launch vehicle, satellite, locomotive, automobile, etc. Commercial environments can include manufacturing facilities or power generation and distribution facilities or infrastructure. Residential environments, such as homes, vehicles, buildings, or workplaces would also be suitable for a temperature sensor.

While "a set of" various elements will be described, it will be understood that "a set" can include any number of the respective elements, including only one element. Furthermore, while "a set of items" includes the plural of 'items', it should be understood that such plural usage does not require more than one item for the set. The singular forms "a", "an", and "the" include plural references unless the context clearly dictates otherwise.

The use of the terms "proximal" or "proximally" refers to moving in a direction toward another component, or a component being relatively closer to the other as compared to another reference point. Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Additionally, connection references (e.g., attached, coupled, connected, and joined) are to be construed broadly and can include intermediate members between a collection of elements and relative movement between elements unless otherwise indicated. The terms "coupled," "fixed," "attached to," and the like refer to both direct coupling, fixing, or attaching, as well as indirect coupling, fixing, or attaching through one or more intermediate components or features, unless otherwise specified herein. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order, environment, and relative sizes reflected in the drawings attached hereto can vary.

Referring now to FIG. 1, an aircraft 10 includes a body 12, with a pair of wings 14 extending from the body 12. The aircraft 10 is shown having an exemplary power distribution system 16 including at least one turbine engine, shown as a left engine 18 and a right engine 20. Alternatively, the power distribution system 16 can have fewer or additional engines or engine systems, and the specific engine not germane to the disclosure.

A temperature sensor 22 can be provided in one or more of the engines 18, 20, or on one or both of the wings 14, or any other suitable position of the aircraft 10, such as within the aircraft 10. While temperature sensing of the exterior of the aircraft 10 with temperature sensors 22 provided in the engines 18, 20 or on the wings is shown, it should be understood that one or more temperature sensors 22 can be positioned anywhere in or along the aircraft 10, such as interior, exterior, or otherwise, where temperature monitoring is or may be desirable. Such interior environments can include electrical areas, such as electronics bays or avionics chassis in non-limiting examples, or other areas wherein temperature reading, management, and control is desired or used.

A controller 30 can be communicatively coupled to the temperature sensors 22, via the power distribution system 16, for example. The controller 30 can includes a processor 32 and a memory 34. The processor 32 can be configured to operate software as well as perform data processing functions, such as requesting, receiving, analysing, modifying, recording, sending, or otherwise utilizing information generated at the temperature sensor 22, such as a signal representative of one or more temperature sensor measurements. Furthermore, the controller 30 can be used to control operation of the temperature sensor 22, as well as request measurements or readings on demand. Similarly, the memory 34 can be used for storing information related to the temperature sensor 22, as well as storing programs or executable instructions, or other historical data or information related to operation of the temperature sensor 22, in addition to other elements of the power distribution system 16 or other vehicle systems.

Additionally, a cockpit 36 of the aircraft 10 can include a display 38, which can be communicatively or operatively coupled to the temperature sensors 22, as well as the controller 30 and the power distribution system 16. The display 38 can provide for displaying or otherwise presenting measurements from the temperature sensors 22, or information indicative thereof. Additionally, it is contemplated that the display 38 can be or include a user interface, such as for requesting measurements from the temperature sensor 22, or otherwise interacting with the temperature sensors 22.

It will be understood that while aspects of the disclosure are shown in an aircraft environment of FIG. 1, the disclosure is not so limited and can have applicability in a variety of environments. The inclusion of the temperature sensor 22 in the aircraft 10 is by way of example only, and it should be appreciated that the temperature sensor 22 can be utilized in a myriad of environments or applications, such as vehicular or non-vehicular implementations, as well as non-aircraft, or terrestrial applications. Furthermore, while this description is directed toward a power system architecture in an aircraft, aspects of the disclosure can be further applicable to non-power system architectures, or any system architecture where temperature measurement is desired.

Further still, the number of and placement of the various temperature sensors 22 depicted in FIG. 1 are also non-limiting examples of aspects associated with the disclosure. For example, while various components have been illustrated with relative position of the aircraft 10 (e.g. on the wings 14 or within an engine 18, 20), aspects of the disclosure are not so limited, and the components and temperature sensors 22 are not so limited based on their schematic depictions. Additional aircraft 10 (as well as non-aircraft) configurations are envisioned.

Figure 2:
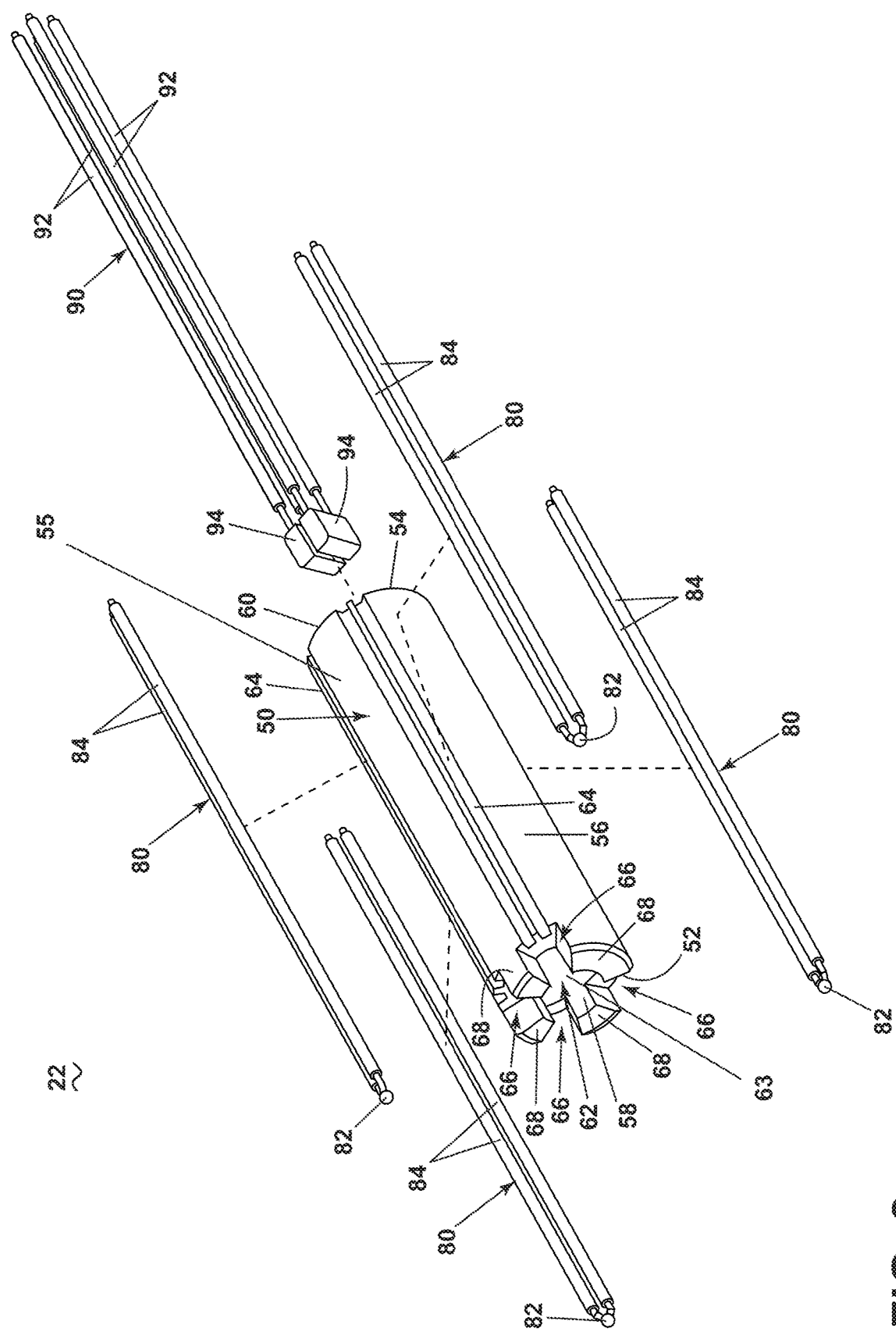
FIG. 2 is an exploded view of the temperature sensor of FIG. 1.

Referring to FIG. 2, an exploded view of one temperature sensor 22 includes a housing 50 having a first end 52 and a second end 54, and defining an exterior surface 55. The housing 50 is defined by a cylindrical, peripheral wall 56, defining a first opening 58 at the first end 52 and a second opening 60 at the second end 54 (hidden from view in FIG. 2). An interior passage 62, defining an interior surface 63, is further defined by and within the housing 50 extending between the first opening 58 and the second opening 60. The housing 50 can be made of a material with a high thermal conductivity, and low density, such as glass-filled polyether ether ketone (PEEK), in one non-limiting example. Additionally, the housing can be made from material that also includes a high electrical isolation, or any suitable material with both a high thermal conductivity and electrical isolation to provide for as accurate a measurement as possible for the sensor 22.

The exterior of the peripheral wall 56 of the housing 50 includes sets of pairs of grooves 64, with the housing 50 shown as having four pairs of grooves 64 (only two pairs are visible as shown), with each pair of grooves 64 extending between the first end 52 and the second end 54. The grooves 64 can be partially, cylindrically shaped, such as having a semi-circular or rounded profile, or a profile slightly greater than that of a semi-circle. Additionally, it is contemplated that the grooves 64 have greater than a half-circle profile, such that an element provided in the grooves 64 can be maintained within the grooves 64 by a snap fit or interference fit. While the grooves 64 are shown in pairs, it is contemplated that there may only be a single groove 64 locally, as opposed to pairs. Additional shapes, sizes, and arrangements are contemplated. While the embodiment as described herein is shown as having four pairs of grooves, it should be appreciated that any number of grooves is contemplated, such as only one groove, or four individual grooves not arranged as pairs. Similarly, any suitable spacing can be used. Preferably, the grooves 64 are shaped and sized to receive a component, such as a wire, in a snap fit or interference fit, as opposed to requiring some other means of fastening, mounting, or coupling. In another example, the grooves 64 need not be linear extending between opposing ends 52, 54, of the housing 50, but can be angled, such as in a spiral or helical arrangement about the housing 50. Additional groove 64 shapes and patterns are contemplated, such as angled, linear, step-wise, curved, unique, or a combination thereof in non-limiting examples. Furthermore, the angular positioning of the grooves about the housing 50 provides for a reduced variation error, as the local variation of the temperature can be offset by comparing the local temperature variation among the multiple sensors.

The housing 50 includes a set of recesses 66 formed in the peripheral wall 56 at the first end 52. Alternatively, it is contemplated that the recesses 66 could be defined by a set of protrusions 68 extending from the first end 52 of the peripheral wall 56, with recesses 66 defined between adjacent protrusions 68. The pairs of grooves 64 terminate at the first end 52 at the recesses 66. Thus, the number of pairs of grooves 64 can be complementary to the number of recesses 66. The sizing and spacing of the recesses 66 or protrusions 68 can vary, such that the spacing between the grooves 64 and the recesses is variable to define protrusions 68 of different sizes.

The particular arrangement and angular position of the grooves 64, the recesses 66, and the protrusions 68, for example, provides for improved accuracy for the sensor 22, and provides for even greater accuracy of measurements when the housing 50 is made of the aforementioned materials. Such details will be further discussed herein.

The sensor 22 can further include a set of four sensor probes 80. The probes 80, for example, can be thermocouples or thermocouple temperature sensors terminating at a probe end formed as a joint 82 connecting two wires 84. An electric current can be provided along the probes 80 to determine a temperature using the thermoelectric effect. The wires 84 can be standard wiring for use with a thermocouple, such as utilizing wires of two differing metals, for example. The wires 84 can be encased with an insulator, such as rubber or plastic, or other common insulators, with the insulators terminating prior to the joint 82 to expose the joint 82 to the environment. The wires 84, with the insulator, can be sized to fit into the pairs of grooves 64, such that the wires 84 are secured within the grooves 64. More specifically, the diameter of the wires 84 can be greater than the width of the opening of the grooves 64, such that an interference fit or a 'snap' fit is achieved for the wiring within the grooves 64. In such a snap fit, insertion of the wires 84 into the grooves 64 requires compression of the wires 84. The wires 84 then reexpand upon insertion into the grooves 64, whereby such expansion secures the wires 84 within the grooves 64. Furthermore, the wires 84 can be positioned in the grooves 64 such that the joint 82 of the probes 80 is provided within the recesses 66.

Additionally, a central sensor probe 90 is provided within the housing 50 extending through the interior passage 62 from the first end 52 to the second end 54, and extending beyond the first end 52. The central sensor probe 90 can be a resistance thermometer or a resistance temperature detector (RTD), in non-limiting examples. The central sensor probe 90 can be two-part, including two sets of wires 92, each set terminating at core 94. The core 94, for example, can be glass or ceramic, with an internal length of wire surrounding the glass or ceramic portion of the core 94, or other typical resistance thermometer configurations.

Figure 3:
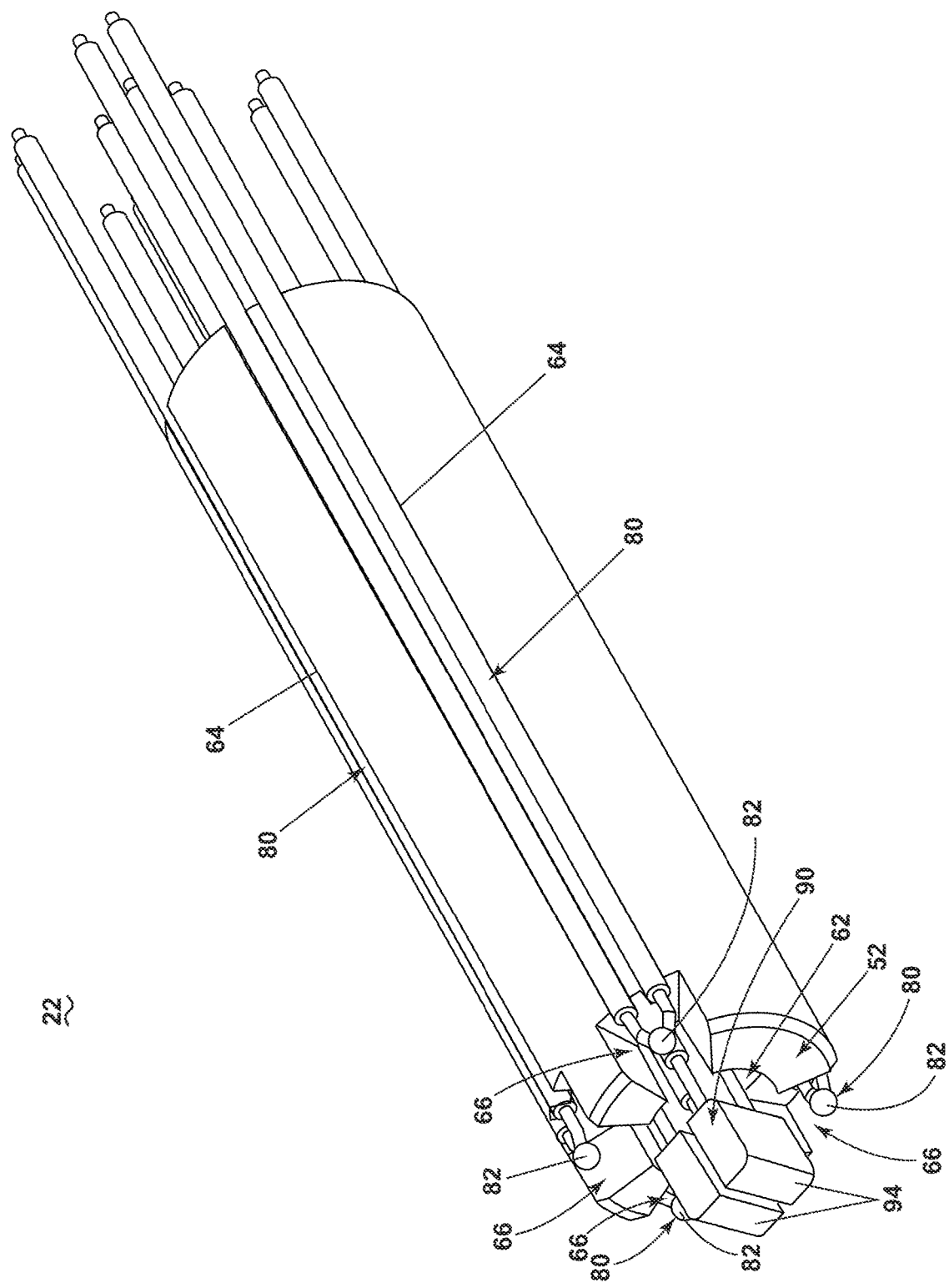
FIG. 3 is a view of the assembled temperature sensor of FIG. 2.

Referring to FIG. 3, showing the assembled sensor 22, the four sensor probes 80 have the sets of wires 84 positioned in the grooves 64 in the exterior surface of the housing 50, with the joints 82 positioned within the recesses 66 at the first end 52. The core 94 of the central sensor probe 90 can be positioned extending from the interior passage 62 beyond the first end 52. An epoxy (FIG. 4), for example, or other suitable fastener, can be provided in the interior passage 62 to secure the position of the central sensor probe 90 after insertion within the interior passage 62. In a separate, non-limiting embodiment, the sensor 22 as shown and assembled can be formed as a complete molded assembly, without requiring the grooves 64 accepting wires 84, but merely creating a unitary assembly including both sets of sensor probes 80, 90. Thus, in such an assembly, the sensor would merely include a housing and a set of sensors or probes, which are molded into a monolithic, unitary assembly. Such an assembly can be formed as a unitary assembly, or can be assembled and then combined into a unitary assembly, such as adding a glue or adhesive to retain the unit as the unitary assembly. In such a case, the housing need not include the grooves, as the adhesive or other elements of the unitary assembly would carry and secure the sensors or probes.

Figure 4:
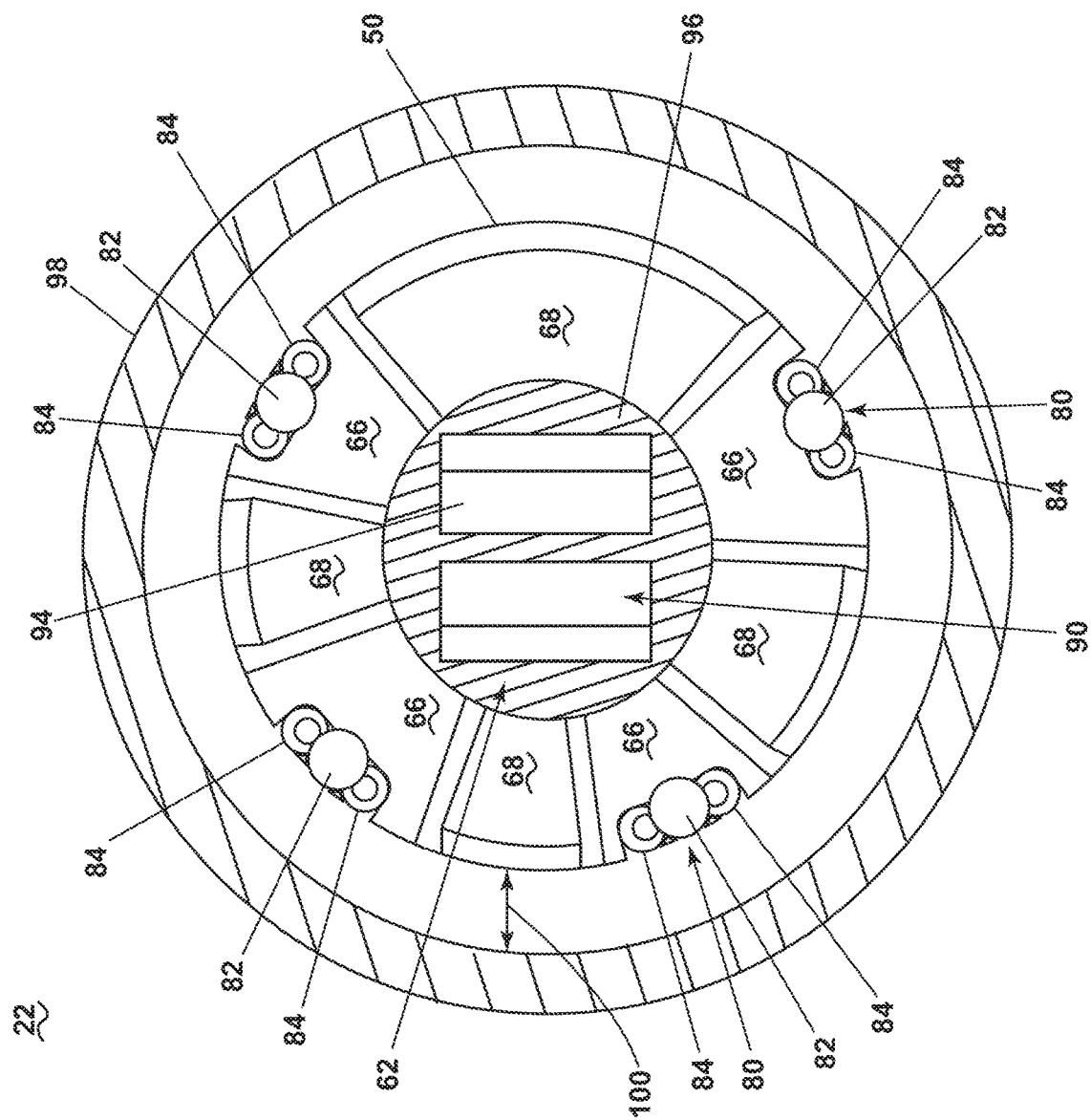
FIG. 4 is a top-down view of the temperature sensor of FIG. 3, having a sheath provided around the temperature sensor, with the sheath shown in cross-section.

Referring to FIG. 4, showing a top-down view, the interior passage 62 is filled with an epoxy 96, while any suitable material can be used to stabilize or mount the central sensor probe 90. A sheath 98 can optionally be provided around the exterior of the sensor 22, to protect the sensor probes 80 from exterior contaminants or weather, defining a gap 100 between the sheath 88 and the housing 50. While the sheath 98 is shown in cross section, it should be understood that the sheath 98 can be the same length as the housing 50, or may be longer or shorter, such as extending beyond the probes 80, 90.

Assembling the sensor 22 can include aligning the sensor wires 84 with the grooves 64 and pushing the wires 84 into the grooves 64 to position the joint 82 in the recesses 66. The central sensor probes 90 can be inserted through the second end 54 until the core 94 extends out of the first end 52. Then, an epoxy, or other suitable fastener or mount system can be used to secure the central sensor probes 90 in place. Non-limiting examples thereof can include glues, mechanical fasteners such as screws or bolts, or more permanent types of mounts, such as welding. The housing can be mounted to the vehicle, structure, or otherwise, for measuring the temperature in that locale.

In operation, the sensor probes 80 and the central sensor probe 90 can be communicatively and operably coupled to the controller 30 via the power distribution system 16. In another, alternative example, the sensor probes 80, 90 can be wirelessly coupled to the power distribution system, or the controller 30, for example, providing for wirelessly communicating measurements by the sensor probes 80, 90. Similarly, the sensor probes 80, 90 can receive instructions form the controller 30 to perform a measurement, or optionally, can periodically make measurements based on a predetermined schedule, or based upon the occurrence of a condition (such as operation of the vehicle, for example). The controller 30 can then parse the measurements made from the multiple sensor probes 80, 90 to determine an accurate temperature, based upon the input from all sensors.

As the sensor 22 makes a reading, the temperature of the local flow of fluid, or air, being measured can change. As described herein, a fluid can be a gas or a liquid, as described herein. Such a change can be caused by a non-uniform flow, for example, or simply a change in the temperature of the flow over time, of just a change in position of a flow having a variable temperature, as it flows along the sensor 22. The set of grooves 64 for positioning the sensor probes 80 provide for positioning the probes 80 in a manner which provides for reduced variation error among all probes 80, 90. Such a reduced variation is particularly important when the flow is undergoing a temperature change. The sensor 22, as described herein, provides for reduced measurement variation during the temperature change of the flow, which provides for more accurate measurements.

Once a temperature measurement is made by the multiple probes 80, 90, the individual measurements from each probe 80, 90 can be recorded and a temperature can be determined. For example, the temperature can be determined as the average temperature among all probes 80, 90. In another example, the temperature can be determined based upon the individual measurements of the probes 80, 90, with the value being weighted based upon the probe. More specifically, the central sensor probes 90 can be a resistance temperature detector (RTD), which is typically more accurate than a thermocouple, which could be used as the exterior sensor probes 80. Regardless of the method, the multiple readings can provide for a more accurate temperature measurement, as compared to existing temperature sensors.

The temperature sensors 22 as described herein provide for improve sensor accuracy. As the temperature sensors 22 are positioned among the exterior and interior of the sensor housing 50, there is a greater opportunity to avoid or mitigate inaccurate readings. Additionally, the design of the housing 50 with the exterior grooves 64 provides for a simple assembly for sensors that are often spaced at 0.2-inch intervals, and are otherwise difficult to assemble in tight spacing. Therefore, the temperature sensor 22 as described herein improves simplicity of installation, reduces cost, and improve measurement accuracy.

Figure 5:
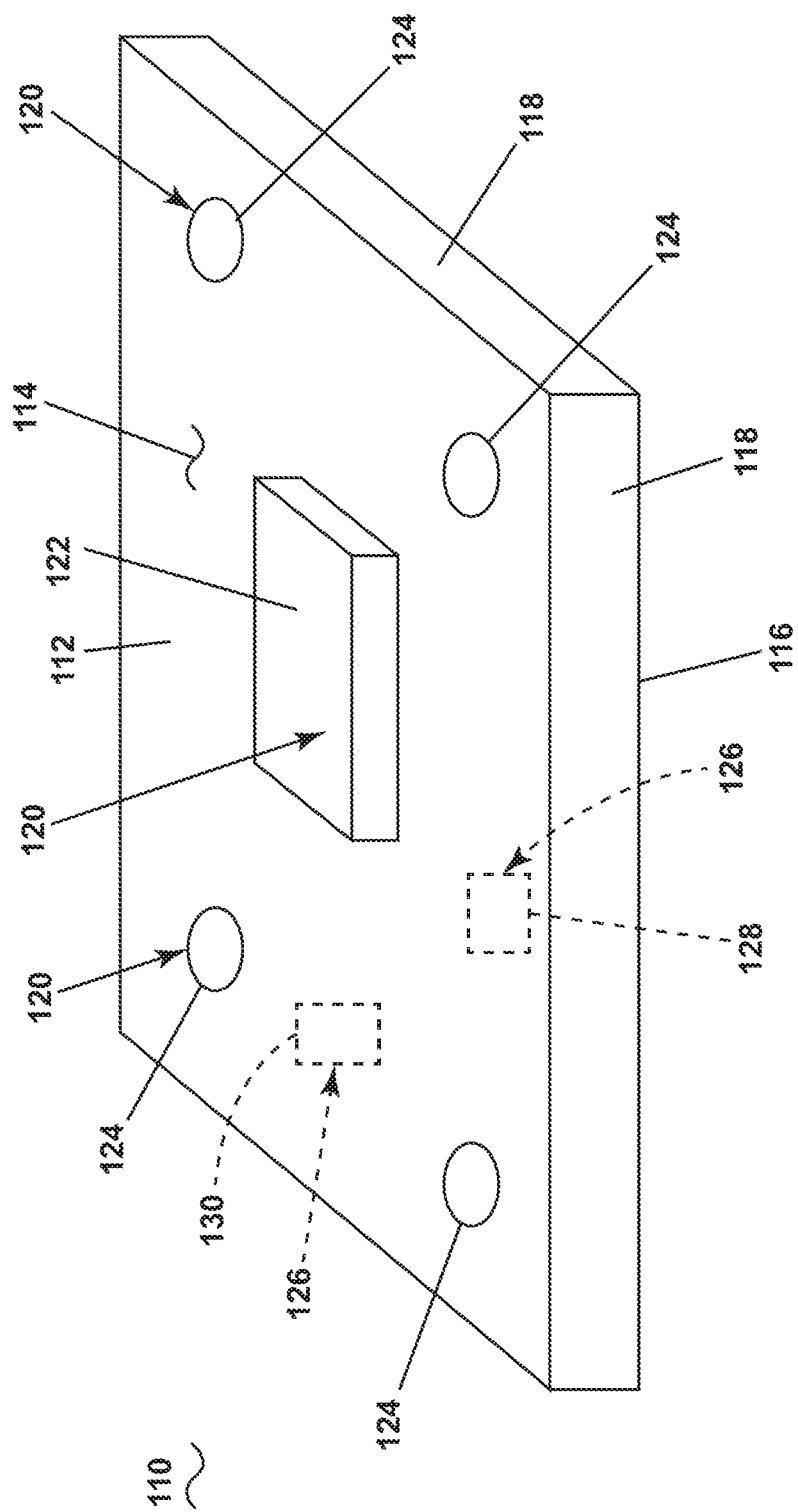
FIG. 5 is a perspective view of another temperature sensor assembly integrated into a circuit board.

Referring now to FIG. 5, another exemplary temperature sensor 110 is arranged in an assembly utilizing a circuit board 112, such as a printed circuit board (PCB), for example or any suitable substrate. The PCB 112 can include a top surface 114 and a bottom surface 116, separated by sidewalls 118. While the geometry of the PCB 112 is that of a rectangle, it should be understood that any geometry is suitable, and should not be limited as shown. Furthermore, it should be understood that the circuit board 112 need not be a traditional circuit board 112, but can be any suitable substrate or material conducive to carrying probes or temperature sensors, such as aerospace fibers, materials, or any suitable material based upon the operational environment.

Figure 6:
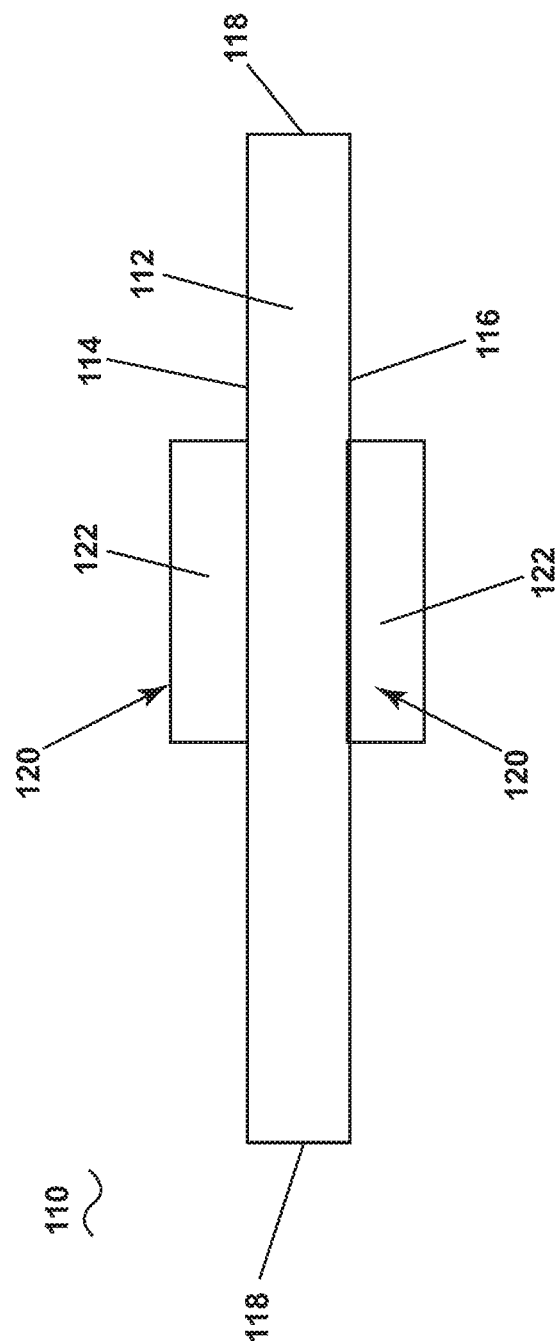
FIG. 6 is a side view of the circuit board of FIG. 5, showing components provided on both the top and bottom of the circuit board.

The temperature sensor 110 can further include a set of sensor probes 120. The sensor probes 120 can be operably and electrically coupled to the PCB 112, as well in communication with other components on the PCB 112. While only sensor probes 120 are shown on the top surface 114, it should be appreciated that sensor probes 120 can be provided in any location or any organization on the PCB 112, such as on the bottom surface 116. For example, FIG. 6, showing the side view of FIG. 5, shows a sensor probe 120 extending from the bottom surface 116.

Still looking at FIG. 5, the sensor probes 120 can include different probes. For example, as shown, the sensor probes 120 can include both RTD sensors 122 and thermocouples 124. The RTD sensors 122 can extend from both the top surface 114 and the bottom surface 116. Similarly, while the thermocouples are only shown on the top surface 114, it is contemplated that the thermocouples can be on any surface of the PCB 112, or among multiple surfaces. For example, there could be four additional complementary thermocouples (not shown) on the bottom surface 116. Thus, it should be appreciated different positional and organizational variations from that as shown in the figures is contemplated.

Additional optional components 126 can be provided on the PCB 112. For example, components such as a controller 128 or processor can be utilized for operating the temperature sensor 110, as well as the sensor probes 120 attached thereto. Additionally, another component could be a memory 130, such as for storing data recording measurements from the sensor probes 120. Additional exemplary components can include, but are not limited to: a wireless transceiver capable of two-way communication for remotely viewing or analyzing the measurements or operating the temperature sensor 110; other types of sensors, such as a pressure sensor, wind-speed sensor, or altimeter; a power input for receiving an electrical current for powering the components and sensors on the PCB 112.

The PCB 112, as well as the sensor probes 120, can be open to the environment, or may be sealed for use where protection of the PCB 112 would be desirable. For example, in an open-air implementation, such as that of an aircraft, direct contact of the fluid (air) with the PCB 112 would be possible. However, in another example, such as measuring oil temperature where the sensor is submerged in the oil or the oil is permitted to flow about the PCB 112, a waterproof coating for the PCB 112 would be desirable to protect the components of the PCB 112. Preferably, such a coating would cover the entirety of the PCB 112, but made of a material with high thermal conductivity, to provide the most accurate temperature measurements as possible. It is further contemplated that such a high thermal conductivity could be limited to just the sensor probes 120, while other protection or coatings can be utilized to protect other portions of the PCB 112.

It should be further appreciated that the PCB 112 as described in relation to FIGS. 5-6, can be utilized without the housing or sealing requirements of the sensor 22 of FIGS. 1-4, and thus can require less parts or can be less complex.

In operation, the sensor probes 120 can be instructed by the controller 128 to make a temperature measurement. The sensor probes 120 can make the measurement, and transmit said measurement to the controller 128 as information or electrical signal. The controller 128 can then send the measurements to another controller or process the measurements. If the controller 128 sends the measurements, then at some communicatively downstream component, the measurements will be ultimately be processed by some controller 128. We will discuss in respect to the controller 128 being provided on the PCB 112, and the processing of the measurements is done at the controller 128 on the PCB 112.

The measurements from the RTD sensors 122 are typically more accurate than that of the thermocouples 124. Thus, the measurements from the RTD sensors 122 can be compared to the measurements of the thermocouples 124 to ensure that measurements remain accurate and consistent over time. More specifically, if over time, there becomes a discrepancy among the temperature as measured by the RTD sensors 122 and the temperature measured by the thermocouples 124, then the controller 128 can make such a determination and act accordingly. Such action can be updating the determined temperature value based upon error identified by the discrepancy among the different sensor types, or alerting someone, such as a pilot or maintenance crew that maintenance is required to correct the variance among the different sensors. In this way, it should be understood that the thermocouples 124 can be used as references for the RTD sensors 122 to ensure an accurate reading. In another example, a determined temperature can be one that is merely an average temperature of all temperatures recorded by the sensors. In yet another example, the thermocouples 124 may be used to detect that a temperature change has occurred, which signals the controller 128 to operate the RTD sensors 122 to make a more accurate measurement. In this way, the thermocouples 124 act as a temperature monitor to signal the RTD sensors to make a measurement, via the controller 128.

Further aspects of the invention are provided by the subject matter of the following clauses:

1. A temperature sensor comprising: a housing with an exterior surface including a first end and a second end; an interior passage extending through the housing between the first end and the second end, defining an interior surface for the housing; a set of grooves provided in the exterior surface extending between the first end and the second end; a set of exterior probes secured to the housing in the set of grooves; and an interior probe extending through the interior passage.

2. The temperature sensor of any preceding clause wherein the interior probe extends through the second end and extends beyond the first end.

3. The temperature sensor of any preceding clause wherein each groove of the set of grooves is linear.

4. The temperature sensor of any preceding clause wherein each exterior probe of the set of exterior probes includes a probe end extending beyond the first end.

5. The temperature sensor of any preceding clause further comprising an epoxy at least partially filling the interior passage and mounting the interior probe within the interior passage.

6. The temperature sensor of any preceding clause wherein the interior probe is a resistance thermometer.

7. The temperature sensor of any preceding clause wherein each exterior probe of the set of exterior probes is a thermocouple.

8. The temperature sensor of any preceding clause wherein the first end further includes a set of recesses defining a set of protrusions between adjacent recesses of the set of recesses extending from the first end.

9. The temperature sensor of any preceding clause wherein the set of grooves are aligned with the set of recesses such that the set of grooves terminates at the set of recesses.

10. The temperature sensor of any preceding clause wherein the set of exterior probes are is positioned in the set of recesses.

11. The temperature sensor of any preceding clause wherein the set of grooves are arranged as a set of pairs of grooves.

12. The temperature sensor of any preceding clause wherein each exterior probe includes a pair of wires, and the pair of wires are retained within the pairs of grooves by a snap fit.

13. The temperature sensor of any preceding clause wherein the housing is made of a thermally conductive and electrically isolated material.

14. A temperature sensor comprising: a housing including an exterior surface extending between a first end and a second end with a set of grooves provided in the exterior surface, and the housing having an interior passage extending through the housing between the first end and the second end; a set of thermocouple temperature sensors mounted to the housing in the set of grooves; and a resistance thermometer mounted to the housing and extending through the interior passage.

15. The temperature sensor of any preceding clause further comprising a set of recesses provided in the first end, with one thermocouple temperature sensor of the set of thermocouple temperature sensors terminating within on recess of the set of recesses.

16. The temperature sensor of any preceding clause wherein the set of grooves are arranged as pairs of grooves, and each thermocouple temperature sensor of the set of thermocouple temperature sensors is mounted to the housing at one pair of grooves.

17. The temperature sensor of any preceding clause wherein the resistance thermometer extends from the interior passage beyond the first end.

18. A temperature sensor comprising: a substrate having a first surface separated from a second surface by a set of sidewalls, a set of thermocouples provided on the first surface of the substrate; and a resistance thermometer provided on the second surface of the substrate.

19. The temperature sensor of any preceding clause wherein the substrate is a printed circuit board.

20. The temperature sensor of any preceding clause wherein the substrate is made of a material with high thermal conductivity and low electrical conductivity.

21. A temperature sensor including: a housing with an exterior surface including a first end and a second end, with a set of grooves provided in the exterior surface extending between the first end and the second end; and a set of exterior probes provided in the set of grooves.

22. The temperature sensor of any preceding clause wherein at least one of the exterior probes of the set of exterior probes includes a probe end extending from the first end.

23. The temperature sensor of any preceding clause wherein the housing includes an interior passage extending between the first end and the second end.

24. The temperature sensor of any preceding clause further comprising at least one central sensor probe passing through the interior passage and extending from the first end.

25. The temperature sensor of any preceding clause further comprising an epoxy filling the interior passage and mounting the central sensor probe within the interior passage.

26. The temperature sensor of any preceding clause wherein the at least one central sensor probe is a resistance thermometer and the set of exterior probes are thermocouples.

27. The temperature sensor of any preceding clause wherein the first end further includes a set of recesses defining a set of protrusions extending from the first end.

28. The temperature sensor of any preceding clause wherein the set of grooves are aligned with the set of recesses such that the grooves of the set of grooves terminate at one of the recesses of the set of recesses.

29. The temperature sensor of any preceding clause wherein the probe end of the set of exterior probes is positioned in the set of recesses.

30. The temperature sensor of any preceding clause wherein the set of grooves are arranged into pairs of grooves.

31. The temperature sensor of any preceding clause wherein each exterior probe includes a pair of wires, with the pair of wires for each exterior probe provided in the pairs of grooves.

32. The temperature sensor of any preceding clause wherein the pair of wires are retained within the grooves by a snap fit.

33. A temperature sensor comprising: a housing extending between a first end and a second end, with an exterior surface and an interior surface, with the housing including an interior passage extending between the first end and the second end, defining the interior surface; a set of grooves provided in the exterior surface extending between the first end and the second end; a set of exterior probes mounted within the set of grooves; and a set of interior probes extending through the interior passage and extending beyond the first end.

34. The temperature sensor of any preceding clause further comprising a set of recesses formed in the housing at the first end, with the set of grooves aligned with and terminating at the set of recesses.

35. The temperature sensor of any preceding clause wherein the set of probes extends from the grooves at the first end and positions within the set of recesses.

36. The temperature sensor of any preceding clause wherein the set of exterior probes mount within the set of grooves with a snap fit.

37. A housing for a temperature sensor, the housing comprising: an exterior surface extending between a first end and a second end; an interior surface defined by an interior passage extending between the first end and the second end; a set of grooves provided in the exterior surface extending between the first end and the second end.

38. The housing of any preceding clause further comprising a set of recesses provided defined at the first end extending between the interior surface and the exterior surface.

39. The housing of any preceding clause wherein the set of recesses defines a set of protrusions at the first end.

40. The housing of any preceding clause wherein the set of grooves are aligned with the set of recesses, with the set of grooves terminating at the set of recesses at the first end.

41. A temperature sensor comprising: a substrate having a first surface separated from a second surface by a set of sidewalls, a set of probes provided on the substrate, with at least some of the probes provided on the first surface and at least some of the probes provided on the second surface.

42. The temperature sensor of any preceding clause wherein the set of probes includes a subset of resistance thermometers and a subset of thermocouples 43. The temperature sensor of any preceding clause wherein at least one resistance thermometer is provided on the first surface and at least one resistance thermometer is provided on the second surface.

44. The temperature sensor of any preceding clause wherein at least one probe of the set of probes is sealed with a coating.

45. A temperature sensor comprising: a housing extending between a first end and a second end, and including an exterior surface; a first set of probes mounted to the housing; and a second set of probes, different from the first set of probes, mounted to the housing.

46. The temperature sensor of any preceding clause wherein the first set of probes are thermocouples and the second set of probes are resistance thermometers.

47. The temperature sensor of any preceding clause wherein the first set of probes extends from the first end of the housing to the second end of the housing.

48. The temperature sensor of any preceding clause wherein the set of exterior probes mount within the set of grooves with a snap fit.

49. A temperature sensor comprising: a substrate having a first surface separated from a second surface by a set of sidewalls, a first set of probes provided on the substrate; and a second set of probes, different than the first set of probes, provided on the substrate.

50. The temperature sensor of any preceding clause wherein the set of probes includes a subset of resistance thermometers and a subset of thermocouples 51. The temperature sensor of any preceding clause wherein at least one resistance thermometer is provided on the first surface and at least one resistance thermometer is provided on the second surface.

52. The temperature sensor of any preceding clause wherein at least some probes of either the first set of probes and the second set of probes are provided on the first surface, and at least some probes of either the first set of probes and the second set of probes are provided on the second surface.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A temperature sensor comprising:
a housing with an exterior surface including a first end and a second end;
an interior passage extending through the housing between the first end and the second end, and defining an interior surface for the housing;
a set of grooves provided in the exterior surface extending between the first end and the second end;
a set of exterior temperature probes secured to the housing in the set of grooves; and
an interior temperature probe extending through the interior passage.

2. The temperature sensor of claim 1, wherein the interior temperature probe extends through the second end and extends beyond the first end.

3. The temperature sensor of claim 1, wherein each groove of the set of grooves is linear.

4. The temperature sensor of claim 1, wherein the housing is made of a thermally conductive and electrically isolated material.

5. The temperature sensor of claim 1, wherein the set of grooves are arranged as a set of pairs of grooves.

6. The temperature sensor of claim 5, wherein each exterior temperature probe includes a pair of wires, and the pair of wires are retained within the pairs of grooves of the set of pairs of grooves by a snap fit.

7. The temperature sensor of claim 1, wherein the first end further includes a set of recesses defining a set of protrusions between adjacent recesses of the set of recesses.

8. The temperature sensor of claim 7, wherein the set of grooves are aligned with the set of recesses such that the set of grooves terminates at the set of recesses.

9. The temperature sensor of claim 8, wherein the set of exterior temperature probes are positioned in the set of recesses.

10. The temperature sensor of claim 1, wherein each exterior temperature probe of the set of exterior temperature probes includes a probe end extending beyond the first end.

11. The temperature sensor of claim 10, further comprising an epoxy at least partially filling the interior passage and mounting the interior temperature probe within the interior passage.

12. The temperature sensor of claim 11, wherein the interior temperature probe is a resistance thermometer.

13. The temperature sensor of claim 12, wherein each exterior temperature probe of the set of exterior temperature probes is a thermocouple.

14. A temperature sensor comprising:
a housing including an exterior surface extending between a first end and a second end A with a set of grooves provided in the exterior surface, the housing having an interior passage extending through the housing between the first end and the second end;
a set of thermocouple temperature sensors mounted to the housing in the set of grooves; and
a resistance thermometer mounted to the housing and extending through the interior passage.

15. The temperature sensor of claim 14, further comprising a set of recesses provided in the first end, with one thermocouple temperature sensor of the set of thermocouple temperature sensors terminating within one recess of the set of recesses.

16. The temperature sensor of claim 14, wherein the set of grooves are arranged as pairs of grooves, and each thermocouple temperature sensor of the set of thermocouple temperature sensors is mounted to the housing at one pair of grooves.

17. The temperature sensor of claim 14, wherein the resistance thermometer extends from the interior passage beyond the first end.

* * * * *